(12) United States Patent
Richardson

(10) Patent No.: US 6,398,236 B1
(45) Date of Patent: Jun. 4, 2002

(54) LIFT AXLE SUSPENSION WITH AXLE RESERVOIR

(75) Inventor: Gregory A. Richardson, Muskegon, MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/613,994

(22) Filed: Jul. 11, 2000

Related U.S. Application Data

(60) Provisional application No. 60/144,294, filed on Jul. 16, 1999.

(51) Int. Cl.[7] .............................................. B62D 61/12
(52) U.S. Cl. ............................. 280/86.5; 280/124.157; 280/124.16; 280/124.161; 280/783; 301/124.1
(58) Field of Search ........................ 280/86.5, 124.157, 280/124.16, 124.161, FOR 161, FOR 168, FOR 171, 783; 301/124.1

(56) References Cited

U.S. PATENT DOCUMENTS

| | | | |
|---|---|---|---|
| 709,324 A | 9/1902 | Honrath | |
| 1,464,441 A | 9/1923 | Osborn | |
| 2,019,811 A | 11/1935 | Graham | |
| 3,880,445 A | 4/1975 | Chieger | |
| 4,322,086 A | 3/1982 | Bennink | |
| 4,557,526 A | 12/1985 | Smith | |
| 4,582,107 A | 4/1986 | Scully | |
| 5,287,906 A | 2/1994 | Stech | |
| 5,374,077 A | * 12/1994 | Penzotti et al. | |
| 5,429,177 A | 7/1995 | Yaron et al. | |
| 6,158,750 A | * 12/2000 | Gideon et al. | ............. 280/86.5 |

FOREIGN PATENT DOCUMENTS

AU              142729     *  8/1951   ........ 280/FOR 168

* cited by examiner

*Primary Examiner*—Eric Culbreth
(74) *Attorney, Agent, or Firm*—McGarry Bair LLP

(57) ABSTRACT

A trailing arm suspension, alone or in combination with a vehicle having a vehicle frame supported by an axle with ground engaging wheels. The trailing arm suspension comprises a pair of spaced trailing arm assemblies, each of which includes a trailing arm pivotally mounted to a the vehicle frame and a spring operably coupling the trailing arm to the frame to resist the pivotal movement of the trailing arm. A pneumatic lift mechanism is provided to selectively raise the trailing arm relative to the frame. The axle has at least a portion of which that is hollow and defines a pressurized air reservoir, which is coupled to the spring and/or the pneumatic lift mechanism to provided pressurized air for altering the resistance of the spring and/or actuating the pneumatic lift mechanism to selective lift the trailing arm.

57 Claims, 4 Drawing Sheets

LIFT AXLE SUSPENSION WITH AXLE RESERVOIR

RELATED APPLICATION

This application claims priority from U.S. Provisional Patent Application with Ser. No. 60/144,294, filed Jul. 16, 1999.

BACKGROUND OF THE INVENTION

1. Field of the Invention

The invention relates to a lift axle suspension. In one of its aspects, the invention relates to a lift axle suspension with a compressed air reservoir for use in raising the lift axle suspension.

2. Description of the Related Art

In trailers or semi-tractors and other heavy-duty vehicles, it is common to use a lift axle suspension to accommodate the different loading scenarios of the tractor/trailer. The lift axle suspension is typically retained in a retracted position beneath the frame of the vehicle until it is needed. The lift axle suspension is lowered into contact with the ground to provide another suspension over which the load of the vehicle is distributed.

Lift axle suspensions typically comprise trailing arms on opposite sides of the vehicle that support an axle. Each trailing arm has one end pivotally mounted to a frame by a hanger bracket and another end connected to the frame by an air spring having an air bag that dampens the rotational movement of the trailing arm in response to forces transferred from the axle. The lift axle suspension further includes an air-operated lift bag for raising and lowering the lift axle suspension into and out of contact with the ground.

The wheels of a lift axle suspension are typically mounted to the axle so that there is a positive castor angle to ensure that the wheels will self-steer to follow the direction of the trailer when the trailer is moving forward. The positive castor angle precludes self-steering of the wheels when the trailer is driven in a rearward direction. The most common solution to the failure of the wheels to self-steer when the vehicle is backed up is to lift the suspension out of ground engaging contact.

The pressurized air for supplying air to the lift bags to lift the suspension during backing is provided by a primary compressed air tank found on the semi tractor. The primary air tank is filled with compressed air by a compressor on the semi tractor and is coupled to the lift bag and air bag systems through a pressure protection valve. The pressure protection valve also couples the primary tank to the vehicle brake system, which is also run on compressed air. The pressure protection valve is designed to shut off the flow of pressurized air to the air spring and lift spring systems when the pressure in the primary tank drops below a predetermined value to ensure sufficient air for the braking operations of the vehicle.

As part of the loading and unloading procedure, it is common to alternate between driving forward and backing up toward a dock to properly position the vehicle. If the lift suspension is activated, the lift bags are inflated and the ride air bags are exhausted to raise the suspension during each back movement and the lift bags are exhausted and the ride air bags inflated during each forward movement. Given the relative air volume of the lift bags and ride air bags and the capacity of the primary tank, the pressure in the primary tank can drop below the protection cut off limit, preventing the direction of compressed air to the lift bags for subsequent maneuvering until the pressure in the primary tank can be brought above the protection limit. Pressurization of the primary tank can take several minutes and can be required after a single backing. Needless to say, waiting any amount of time, let alone up to several minutes, for the primary tank to pressurize above the operational limit is considered a great disadvantage and an annoyance by the vehicle operator.

Previous attempts to address this solution have focused on adding secondary tanks to the vehicle, which are filled by the tractor compressor. The disadvantage of secondary tanks is that they are typically located within the frame of a tractor or trailer. Unfortunately, the typical tractor/trailer does not have the available space needed to properly locate and position a suitably sized secondary tank. Further, these auxiliary tanks add additional weight to the vehicle.

SUMMARY OF THE INVENTION

The invention relates to an improved trailing arm suspension alone or in combination with a vehicle having a pneumatic system and a vehicle frame on an axle with ground engaging wheels. The trailing arm suspension comprises a pair of trailing arm assemblies adapted to be mounted to the vehicle frame in spaced relationship. Each of the trailing arm assemblies comprises a trailing arm having one portion adapted to be pivotally mounted to the vehicle frame for pivotal movement about a pivot axis and a spring adapted to operably connect the trailing arm to the vehicle frame for resisting the pivotal movement of the trailing arm about the pivotal axis toward the frame. The axle is carried by the trailing arms and connected thereto for movement with the trailing arms. The spring is adapted to be coupled to the pneumatic air system to supply pressurized air thereto. A pneumatic lift mechanism is mounted on the trailing arm for raising the trailing arm with respect to the frame when pressurized. According to the invention, at least a portion of the axle has a sealed hollow interior forming a pressurized air reservoir and is pneumatically connected to the pneumatic lift mechanism for selectively raising the trailing arm with respect to the frame.

Preferably, the pneumatic lift mechanism is also pneumatically connected to one of the frame and the axle. The pneumatic lift mechanism is preferably an inflatable bag. The suspension can also include an air spring operably connecting the trailing arm to the frame and an air controller fluidly coupling the reservoir to the air spring and controlling the introduction of pressurized air from the reservoir to the air spring.

The axle can be made in various ways but preferably comprises an enclosed and sealed elongated hollow; body forming the air reservoir. The hollow body comprises an elongated plate with a u-shaped cross section defining an open top and open ends, a top plate mounted to the u-shaped plate to cover the open top, and end plates mounted to the u-shaped plate to cover the open ends. The axle can include a spindle assembly mounted to each end of the hollow body for rotatably mounting ground engaging wheels. The spindles are typically rotatably mounted to the axle to form a steerable axle.

A valve can be provided in a pneumatic line between the air reservoir and the pneumatic lift mechanism for controlling the pneumatic pressure to the pneumatic lift mechanism. A controller can be connected to the valve for selectively controlling the operation of the valve. A direction sensor can be provided and electrically or pneumatically coupled to the controller for detecting a reverse operation of the vehicle and to open the valve and raise the trailing arm when the vehicle moves in a reverse direction. The direction sensor can also detect a forward operation of the vehicle to exhaust the pressurized air from the pneumatic lift mechanism during forward operation to lower the trailing arm with respect to the frame. Preferably, the direction sensor is a back-up light circuit for the vehicle or a transmission switch.

Further according to the invention, an improved trailing arm suspension for supporting a vehicle with a pneumatic system between a vehicle frame and an axle with ground engaging wheels comprises a pair of trailing arm assemblies adapted to be mounted to the vehicle frame in spaced relationship. Each of the trailing arm assemblies comprises a trailing arm having one portion adapted to be pivotally mounted to the vehicle frame for pivotal movement about a pivot axis and a spring adapted to operably connect the trailing arm to the vehicle frame for resisting the pivotal movement of the trailing arm about the pivotal axis toward the frame and adapted to be coupled to the pneumatic air system to supply pressurized air thereto. At least a portion of the axle has a hollow interior forming a pressurized air reservoir and is connected to the pneumatic system. According to the invention, a pneumatic lift mechanism is connected to the trailing arm for raising the trailing arm with respect to the frame when pressurized with air and the pneumatic lift mechanism is connected to the air reservoir for selectively raising the trailing arm with respect to the frame.

Still further according to the invention, an improved trailing arm suspension for supporting a vehicle with a pneumatic system between a vehicle frame and an axle with ground engaging wheels comprises a pair of spaced apart trailing arm assemblies adapted to be mounted to the vehicle frame. Each of the trailing arm assemblies comprises a trailing arm having one portion adapted to be pivotally mounted to the vehicle frame for pivotal movement about a pivot axis and an air spring adapted to operably connect the trailing arm to the vehicle frame for resisting the pivotal movement of the trailing arm about the pivotal axis toward the frame and is adapted to be coupled to the pneumatic air system to supply pressurized air thereto. At least a portion of the axle has a sealed hollow interior forming a pressurized air reservoir and is pneumatically connected to the pneumatic system. According to the invention, the air reservoir is connected to the air spring for pressurizing the air spring.

DETAILED DESCRIPTION OF THE PREFERRED EMBODIMENTS

Figure 1:
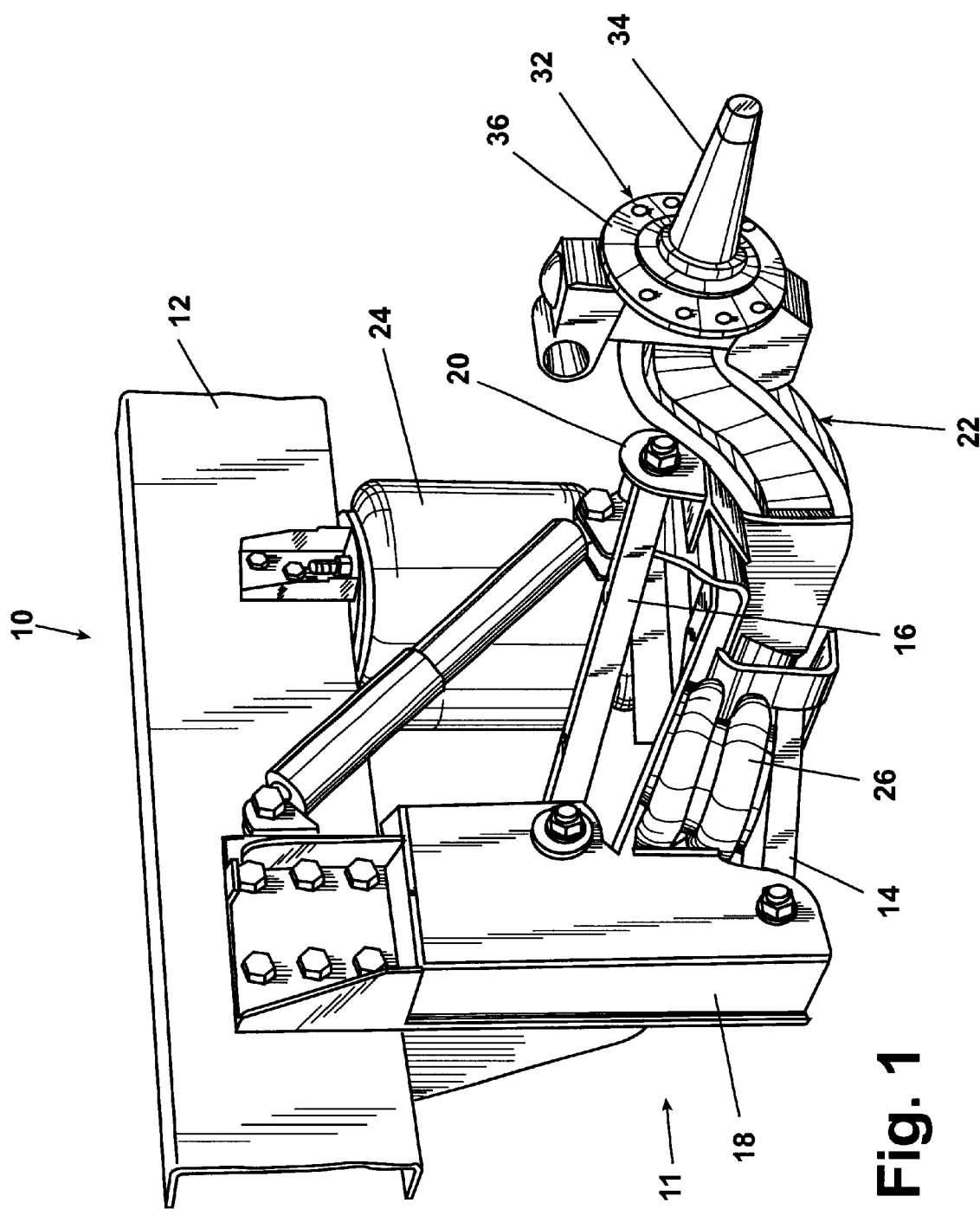
FIG. 1 is a perspective view of a lift axle suspension incorporating a reservoir axle according to the invention.

FIG. 1 illustrates a lift axle suspension 10 according to the invention comprising a trailing arm assembly 11 mounted to a trailer frame rail 12. Although the lift axle suspension 10 comprises opposing, generally identical, trailing arm assemblies 11, only one such trailing arm assembly will be described in detail. The trailing arm assembly 11 comprises lower and upper trailing arms 14, 16 each having one end pivotally mounted to a hanger bracket 18, which is fixably connected to the frame rail 12. Each of the trailing arms 14, 16 have an opposite end that is pivotally mounted to an axle bracket 20, which is fixedly mounted to an axle 22 according to the invention.

The connection of the lower and upper trailing arms 14, 16 between the hanger bracket 18 and the axle bracket 20 defines a parallelogram linkage between the hanger bracket 18 and the axle 22. An air spring 24 is mounted between the axle 22 and the frame rail 12 and dampens the movement of the axle 22 in response to contact with the ground surface during operation. A lift bag 26 is positioned between the axle bracket 20 and the lower trailing arm 14 to provide for the raising of the axle 22 in response to the addition of pressurized air into the lift bag 26 and the lowering of the axle 22 in response to the exhaustion of air from the lift bag 26.

The location of the lift bag 26 is preferred for the parallelogram trailing arm suspension disclosed in FIG. 1. The location of the lift bag is not limiting to the invention, nor is the parallelogram trailing arm suspension. In the parallelogram suspension, the lift bag can be positioned at any location where the inflation of the bag opens the parallelogram. For example, the lift bag can be positioned between the frame or frame bracket and the upper trailing arm. Examples of such a suspension and lift bag construction are shown in U.S. Pat. No. 6,062,578, which is incorporated by reference. Additionally, in a single trailing arm suspension, the lift bag can be positioned such that it applies a force on the opposite side of the trailing arm pivot than the axle to raise the axle when inflated. U.S. Pat. No. 5,403,031 discloses many variations on such a lift axle suspension and is incorporated by reference.

It should also be noted that the air bag can be replaced by any suitable pneumatic lift mechanism. Suitable alternatives include traditional pneumatic cylinders having a housing in which is slidably mounted a piston having a head disposed within the housing and a rod or shaft extending from the head and out through an opening in the housing. A pressure chamber is formed by the interior of the housing and the head. The pressure is connected to the pneumatic air source where air can be introduced into or exhausted from the pressure chamber to reciprocate the shaft relative to the housing. Typically, one of the housing and the shaft is connected to the frame and the other of the housing and the shaft is connected to the trailing arm so that the reciprocation of the shaft moves the trailing arm relative to the frame.

Figure 2:
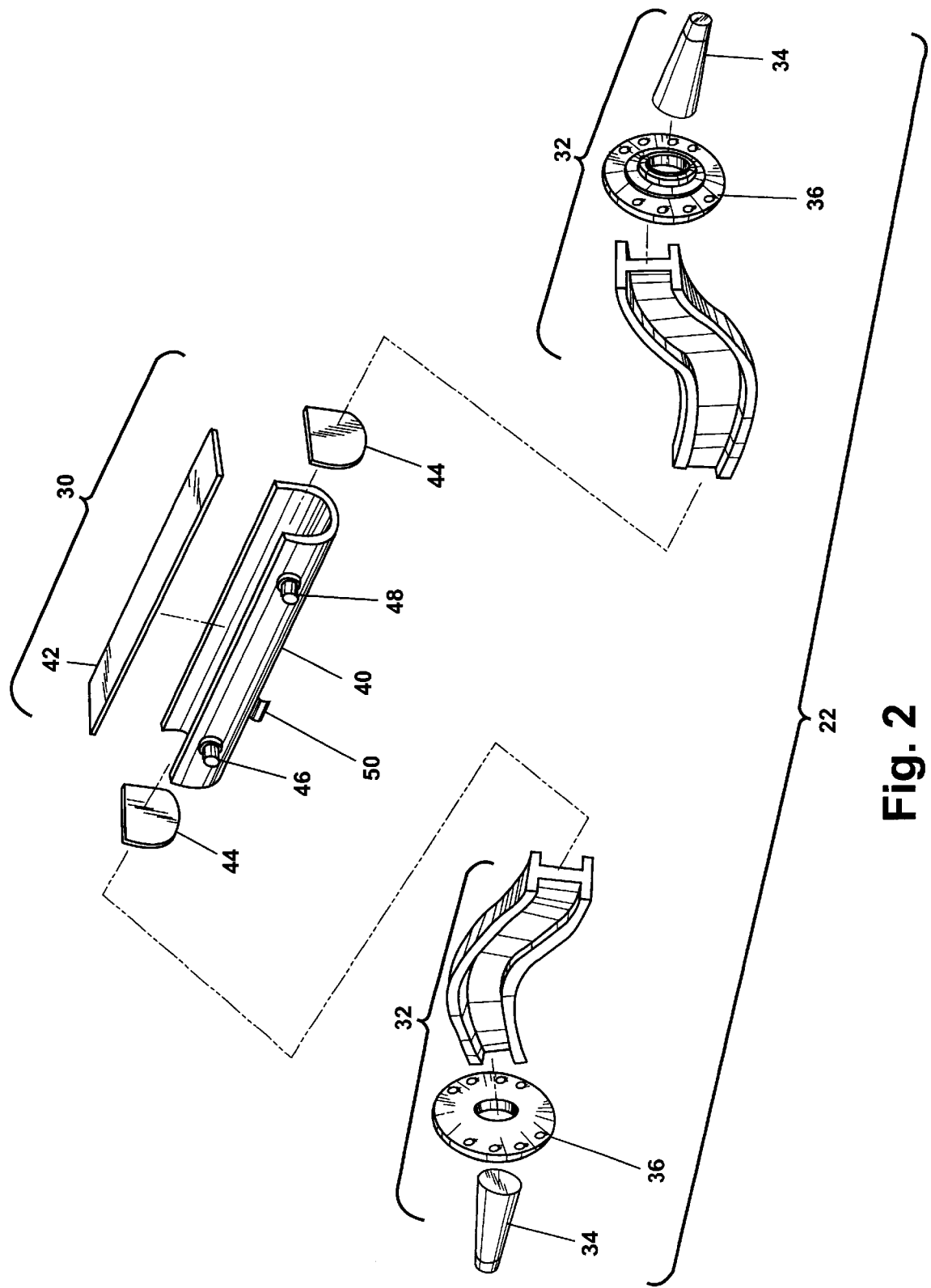
FIG. 2 is an exploded view of the reservoir axle of FIG. 1 with some portions removed for clarity.

Referring to FIG. 2, the axle 22 is shown in greater detail and comprises an air reservoir 30 and opposing spindle assemblies 32, which include spindles 34 and mounting plates 36 for mounting the wheel (not shown) and brake assemblies (not shown). The spindle assemblies are well known and will not be described in further detail.

The air reservoir 30 is preferably formed from a U-shaped body having an open top and ends that are closed by an upper plate 42 and end plates 44, preferably by welding, to form a fluid tight chamber. The U-shaped body 40 is fitted with an inlet connector 46 and an outlet connector 48. A drain valve 50 is also provided in the body for the periodic draining of any moisture that may condense in the reservoir.

Although the preferred construction of the air reservoir 30 is in the form of a U-shaped body with a top plate and opposing end plates to close the body, it is within the scope of the invention to use other suitable constructions. For example, the U-shaped body 40 could easily be replaced by three different plates, which along with the top, could be welded to form an open-ended box. Similarly, the end plates could be integrally formed with one or more of the side plates. Preferably, the plates are all welded together.

Figure 3:
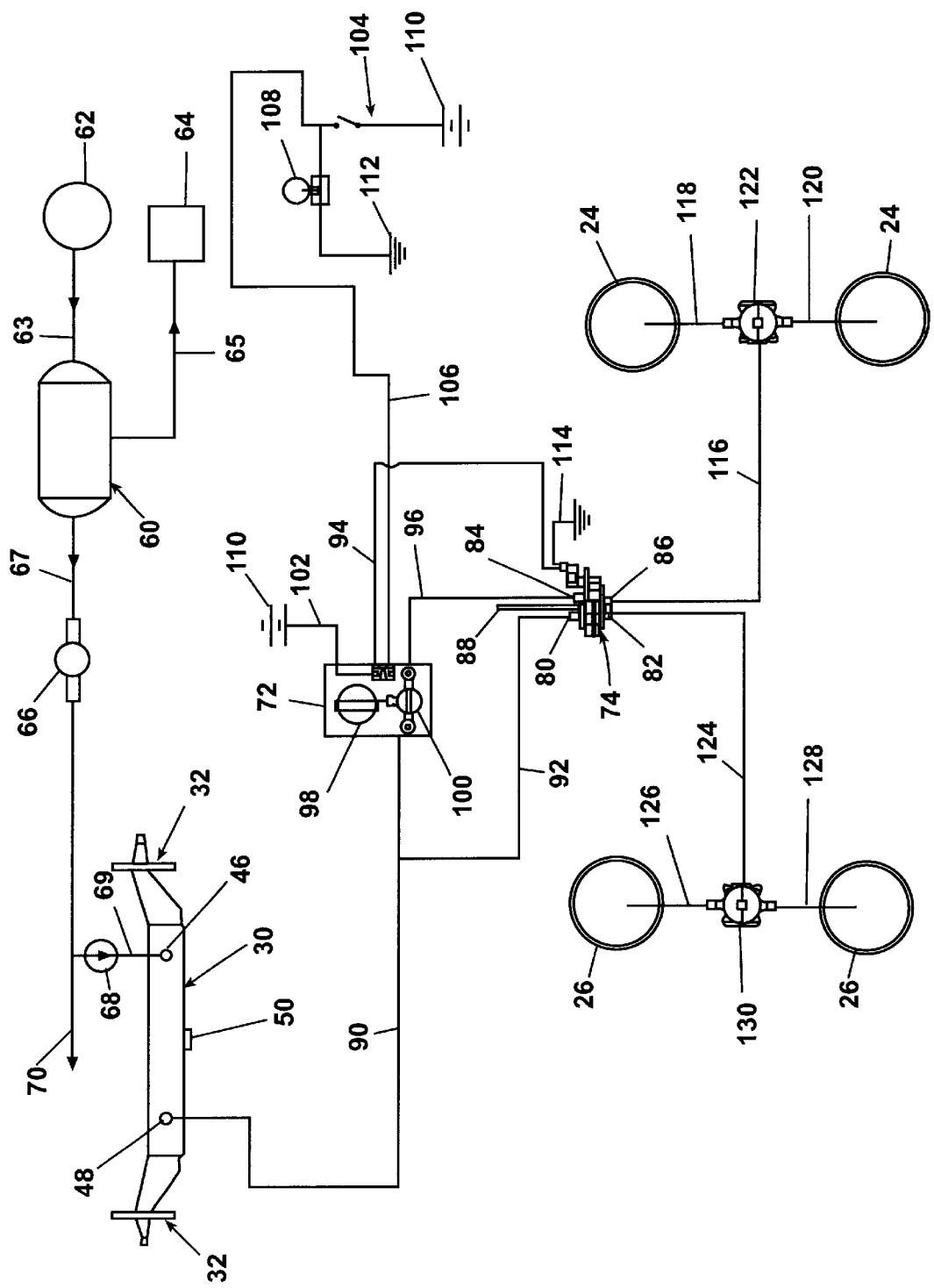
FIG. 3 is a schematic drawing of an air pressure system for the lift axle suspension of FIG. 1 according to one embodiment of the invention.

FIG. 3 is a schematic view illustrating the pneumatic system for an axle reservoir according to one embodiment of the invention. The tractor portion of the pneumatic system comprises a primary tank 60 that is charged or pressurized by a compressor 62 through fluid line 63. The primary tank 60 is fluidly connected to the tractor and trailer brake system 64 through fluid line 65 and to the axle reservoir 30 through a fluid line 67 having a pressure protection valve 66 and fluid line 69 having a check valve 68. The primary tank 60 is fluidly connected to other air operated devices that are supplied by fluid conduit 70.

The axle reservoir 30 is connected to a pressure controller 72 through the outlet connector 48 and a fluid conduit 90 and to a solenoid valve 74 through fluid conduit 92. The pressure controller 72 has a pressure gauge 98, a pressure regulator 100, a manual input control line 102, a condition responsive input control line 106 and an output control line 94. The manual control line 102 can be connected to a back up light circuit 104 for the tractor/trailer. The back up light circuit 104 comprises a battery 110, a lamp 108 and a ground 112. The manual input control line 102 can be connected to a switch on the dashboard of the tractor vehicle.

The controller 72 is adapted to control the operation of the solenoid valve 74 in response to an input signal in input line 106. In the embodiment shown in FIG. 3, the input signal is created by an electrical signal that is coupled to the back-up lights of the vehicle. In the embodiment shown in FIG. 4, the input signal is created by an electrical signal that is coupled to or the reverse position of the vehicle transmission 132. When the back-up lights are energized or the vehicle is placed in reverse, the input signal in control line 106 is used by the controller 72 to generate an output signal which is applied to the solenoid 74 through control line 94. The controller 72 can be a microprocessor or can be a hard wired circuit board. The transmission 132 has a microswitch 134 (FIG. 4) which is gated in response to a shift of the transmission to the reverse position.

The solenoid valve 74 comprises five ports 80, 82, 84, 86, and 88. The port 80 is fluidly connected to the outlet connector 48 of the axle reservoir through fluid line 92. The port 82 is fluidly connected to the lift bags 26 through fluid lines 124, 126 and 128 and valve 130. The port 84 is fluidly connected to the regulator 100 through fluid conduit 96. The port 86 is fluidly connected to the air springs 24 through fluid lines 116, 118 and 120 and valve 122. The port 88 is open to the atmosphere.

The operation of the pneumatic system incorporating the axle reservoir according to the invention will now be described, assuming initially that tractor and trailer in moving in the forward position and the primary tank 60 is fully charged. It is also assumed that the air springs 24 are fully charged. In this condition, the solenoid valve 74 port 84 is open to port 86 and port 82 is open to the exhaust port 88, thereby exhausting any fluid within the lift bags 26.

Figure 4:
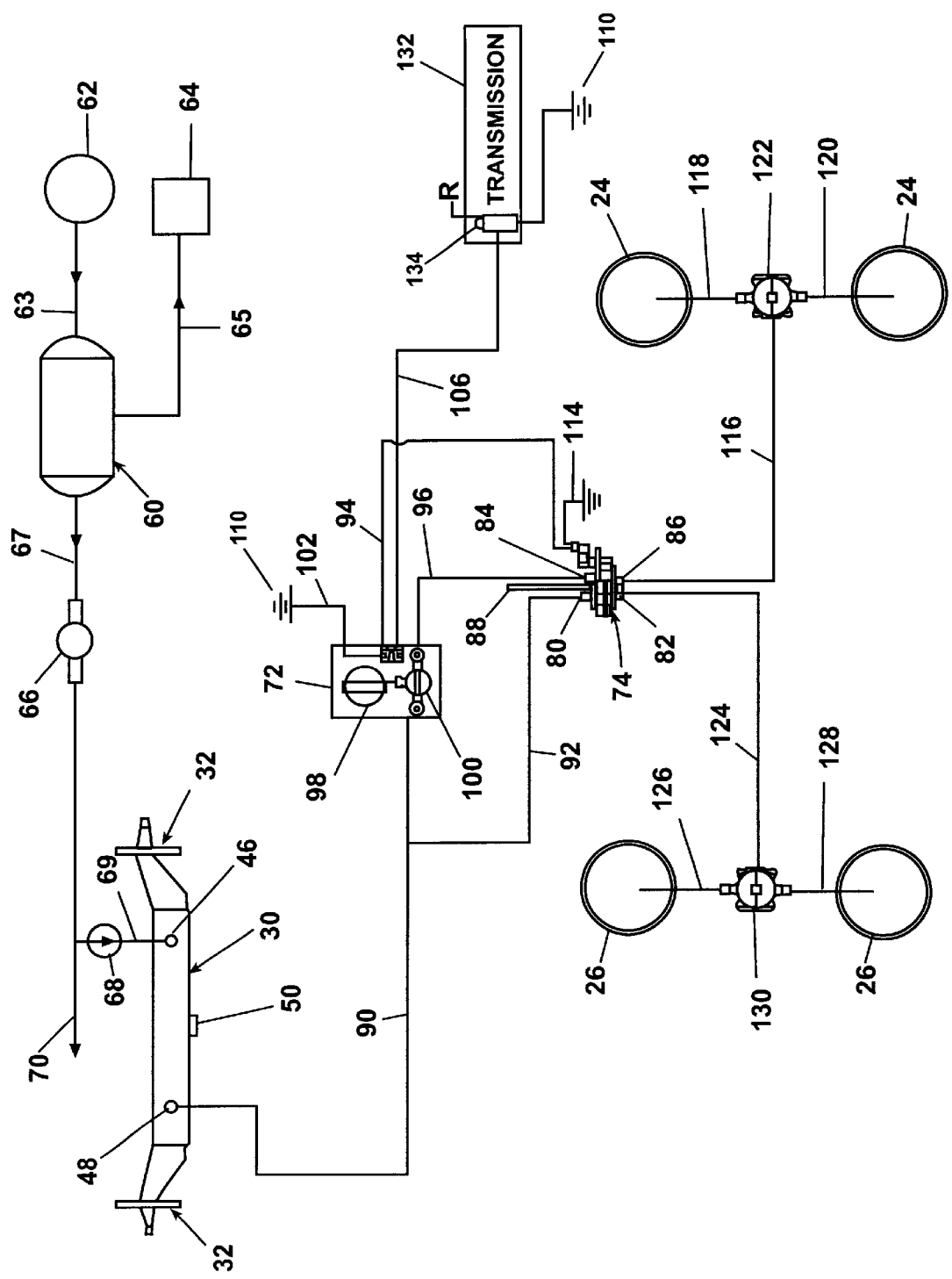
FIG. 4 is a schematic drawing of an air pressure system for the lift axle suspension of FIG. 1 according to another embodiment of the invention.

When the operator of the vehicle shifts the tractor into reverse, the controller 72 receives a control signal from the back up light circuit (FIG. 3) or the transmission microswitch 134 (FIG. 4). In response thereto, the controller 72 energizes the solenoid 74 to open port 80 to port 82 to permit the introduction of pressurized air from the axle reservoir 30 into the lift bags 26. Simultaneously, the controller 72 closes port 84 and opens port 86 to exhaust port 88 to exhaust any pressurized fluid contained within the ride air springs 24. The filling of the lift bags continues as pressure in the lift bags reaches a full line pressure which is representative of lifting the lift axle off the ground. When the operator shifts from the reverse direction to the forward direction, the reverse operation takes place in that the air bags 24 are re-inflated and the lift bags are deflated.

The primary tank 60 in combination with the pressure protection valve 66 operates in the traditional manner in that the primary tank 60 and compressor 62 will continue to supply air to the axle reservoir 30 as long as the pressure protection valve senses that the pressure in the primary tank 60 is below a predetermined limit.

The axle reservoir 30 in essence functions like a secondary tank and is the primary source of pressurized air to enable the lifting and lowering of a lift axle suspension. The primary tank 60 is relieved of the burden of raising and lowering the lift axle suspension and only need supply the axle reservoir. The additional volume of pressurized air available from the axle reservoir 30 makes it less likely that the vehicle operator will have to wait for the auxiliary tank or the primary tank to charge during the forward and backward operation of the vehicle prior to docking, etc. The axle reservoir tank accomplishes this goal without using the valuable and limited space within the vehicle frame as in previous secondary tank designs. The axle reservoir achieves this additional function by using the existing capacity of the axle so that little or no additional weight is added to the vehicle by the secondary or auxiliary tank.

The controller and valve are also capable of introducing or exhausting pressurized air from the reservoir to the air springs. A general application of this function is to adjust the height of the vehicle. Specifically, if the vehicle is a trailer, the height of the vehicle can be maintained at a predetermined height against a loading dock. It is common for a trailer to drop in height as it is being loaded because of the increased force acting on the air springs results in their partial collapse. Additional air can be supplied to the air springs to counter the increased load and maintain the vehicle at a predetermined height.

While the invention has been specifically described in connection with certain specific embodiments thereof, it is to be understood that this is by way of illustration and not of limitation, and the scope of the appended claims should be construed as broadly as the prior art will permit. Reasonable variation and modification are possible within the scope of the forgoing description and drawings without departing from the scope of the invention. For example, while the preferred type of suspension to which the axle is connected is the trailing arm suspension illustrated in the drawings, the axle with reservoir can be used with any type of suspension. The axle also need not be a steerable axle as shown. Also, the term trailing arm suspension as used herein is not limited to a single trailing arm, but includes other suspensions, such as the parallelogram suspension illustrated in the drawings. Any suspension having one or more arms pivotally mounted to the frame and carrying the axle will satisfy the trailing arm suspension requirement, including an arm that is a spring beam, a leaf spring, or other configurations.

What is claimed is:

1. In a trailing arm suspension for supporting a vehicle with a pneumatic system and a vehicle frame on ground engaging wheels, the trailing arm suspension comprising:
   a pair of trailing arm assemblies adapted to be mounted to the vehicle frame in spaced relationship, each of the trailing arm assemblies comprising:

a trailing arm having one portion adapted to be pivotally mounted to the vehicle frame for pivotal movement about a pivot axis;

a spring mounted to a second portion of the trailing arm and adapted to be mounted to the vehicle frame for resisting the pivotal movement of the trailing arm about the pivotal axis toward the frame; and a pneumatic lift mechanism mounted to the trailing arm for raising the trailing arm with respect to the frame when pressurized; and an axle mounted to the trailing arms for movement therewith;

the improvement comprises:

at least a portion of the axle has a sealed hollow interior forming a pressurized air reservoir that is adapted to be pneumatically connected to the pneumatic system; and the air reservoir is pneumatically connected to the pneumatic lift mechanism for selectively raising the trailing arm with respect to the frame.

2. The trailing arm suspension according to claim 1 wherein the pneumatic lift mechanism is also adapted to be mounted to one of the frame and the axle.

3. The trailing arm suspension according to claim 1 and further comprising a valve between the air reservoir and the pneumatic lift mechanism for controlling the pneumatic pressure to the pneumatic lift mechanism.

4. The trailing arm suspension according to claim 3 and further comprising a controller connected to the valve for selectively controlling the operation of the valve.

5. The trailing arm suspension according to claim 4 and further comprising a direction sensor for detecting a reverse operation of the vehicle and operably connected to the controller to open the valve to raise the trailing arm when the vehicle moves in a reverse direction.

6. The trailing arm suspension according to claim 5 wherein the direction sensor further detects a forward operation of the vehicle and the controller controls the valve to exhaust the pressurized air from the pneumatic lift mechanism during forward operation to lower the trailing arm with respect to the frame.

7. The trailing arm suspension according to claim 6 wherein the spring is an air spring and the valve is a solenoid-actuated valve having an inlet port fluidly connected to the reservoir, an air spring port fluidly connected to the air spring, a pneumatic lift mechanism port fluidly connected to the pneumatic lift mechanism, and an exhaust port fluidly connected to atmosphere.

8. The trailing arm suspension according to claim 6 wherein the direction sensor is a back-up light circuit for the vehicle.

9. The trailing arm suspension according to claim 6 wherein the direction sensor is a transmission switch.

10. The trailing arm suspension according to claim 1 wherein the spring is an air spring operably connecting the trailing arm to the frame and further comprising an air controller fluidly coupling the reservoir to the air spring and controlling the introduction of pressurized air from the reservoir to the air spring.

11. The trailing arm suspension according to claim 1 wherein the axle comprises an elongated hollow body forming the air reservoir.

12. The trailing arm suspension according to claim 11 wherein the axle further comprises a spindle assembly mounted to each end of the hollow body for rotatably mounting a said ground-engaging wheel.

13. The trailing arm suspension according to claim 12 wherein the spindles are rotatably mounted to the hollow body for steering the vehicle.

14. The trailing arm suspension according to claim 11 wherein the hollow body comprises an elongated plate with a U-shaped cross section defining an open top and open ends, a top plate mounted to the U-shaped plate to cover the open top, and end plates mounted to the U-shaped plate to cover the open ends.

15. The trailing arm suspension according to claim 14 wherein the plates are welded together.

16. The trailing arm suspension according to claim 11 and further comprising an air fitting mounted to the hollow body for pneumatically coupling the pneumatic lift mechanism to the air reservoir.

17. The trailing arm suspension according to claim 1 wherein the pneumatic lift mechanism is an inflatable bag.

18. The trailing arm suspension according to claim 17 wherein each trailing arm assembly further comprising a second arm having one portion adapted to be pivotally connected to the vehicle frame and a second portion connected to the axle.

19. The trailing arm suspension according to claim 18 wherein the first arm has a second portion and each second portion of the first and second arms is pivotally connected to the axle to form a parallelogram suspension.

20. The trailing arm suspension according to claim 19 and further comprising an axle bracket mounted-to the axle and the second portions of the first and second trailing arms are pivotally mounted to the axle bracket.

21. The trailing arm suspension according to claim 20 wherein the first and second arms diverge relative to each other in a direction from the first portion to the second portion.

22. The trailing arm suspension according to claim 20 wherein the inflatable bag is connected between one of the trailing arms and the axle bracket.

23. In a vehicle supported on an axle with ground engaging wheels, the vehicle comprising:

a frame;

a source of pressurized air;

a pair of trailing arm assemblies mounted to the vehicle frame in spaced relationship, each of the trailing arm assemblies comprising:

a trailing arm having one portion pivotally mounted to the vehicle frame for pivotal movement about a pivot axis; and a spring operably mounted between the trailing arm and adapted to be mounted to the vehicle frame for resisting the pivotal movement of the trailing arm about the pivotal axis toward the frame;

a pneumatic lift mechanism connected to the trailing arm for raising the trailing arm with respect to the frame when pressurized;

the axle mounted to the trailing arms for movement therewith; and the improvement comprises:

at least a portion of the axle has a sealed hollow interior forming a pressurized air reservoir and is connected to the source of pressurized air; and the air reservoir is pneumatically connected to the pneumatic lift mechanism for selectively raising the trailing arm with respect to the frame.

24. The vehicle according to claim 23 wherein the pneumatic lift mechanism is also mounted to one of the frame and the axle.

25. The vehicle according to claim 23 and further comprising a valve between the air reservoir and the pneumatic lift mechanism for controlling the pneumatic pressure to the pneumatic lift mechanism.

26. The vehicle according to claim 25 and further comprising a controller connected to the valve for selectively controlling the operation of the valve.

27. The vehicle according to claim 26 and further comprising a direction sensor for detecting a reverse operation of the vehicle and operably connected to the controller to open the valve to raise the trailing arm when the vehicle moves in a reverse direction.

28. The vehicle according to claim 27 wherein the direction sensor is further adapted to detect a forward operation of the vehicle; and the controller controls the valve to exhaust the pressurized air from the pneumatic lift mechanism during forward operation of the vehicle to lower the trailing arm with respect to the frame.

29. The vehicle according to claim 23 wherein the spring between the trailing arm and the frame is an air spring; and further comprising an air controller fluidly coupling the reservoir to the air spring for controlling the introduction of pressurized air from the reservoir to the air spring.

30. The vehicle according to claim 23 wherein the axle comprises an elongated hollow body forming the air reservoir.

31. The vehicle according to claim 30 wherein the hollow body comprises an elongated plate with a U-shaped cross section defining an open top and open ends, a top plate mounted to the U-shaped plate to cover the open top, and end plates mounted to the u-shaped plate to cover the open ends.

32. The vehicle according to claim 23 wherein the pneumatic lift mechanism is an inflatable bag.

33. The vehicle according to claim 23 wherein each trailing arm assembly further comprising a second arm having one portion pivotally connected to the vehicle frame and a second portion connected to the axle; and the inflatable bag extends between one of the first and second arms and one of the frame and axle.

34. In a trailing arm suspension for supporting a vehicle with a pneumatic system and a vehicle frame on an axle with ground engaging wheels, the trailing arm suspension comprising:
   a pair of trailing arm assemblies adapted to be mounted to the vehicle frame is spaced relationship, each of the trailing arm assemblies comprising:
      a trailing arm having one portion adapted to be pivotally mounted to the vehicle frame for pivotal movement about a pivot axis;
      a spring mounted to the trailing arm and adapted to be mounted to the vehicle frame for resisting the pivotal movement of the trailing arm about the pivotal axis toward the frame; and
      at least a portion of the axle has a sealed hollow interior forming a pressurized air reservoir and is adapted to be connected to the pneumatic system; and
   the axle is mounted to the trailing arms for movement therewith; and
   the improvement comprises:
      a pneumatic lift mechanism mounted on the trailing arm for raising the trailing arm with respect to the frame when pressurized; and
      the air reservoir is connected to the pneumatic lift mechanism for selectively raising the trailing arm with respect to the frame.

35. The trailing arm suspension according to claim 34 wherein the pneumatic lift mechanism is also mounted to one of the frame and the axle.

36. The trailing arm suspension according to claim 34 and further comprising a valve between the air reservoir and the pneumatic lift mechanism for controlling the pneumatic pressure to the pneumatic lift mechanism.

37. The trailing arm suspension according to claim 34 and further comprising a controller connected to the valve for selectively controlling the operation of the valve.

38. The trailing arm suspension according to claim 37 and further comprising a direction sensor for detecting a reverse operation of the vehicle and connected to the controller to open the valve to raise the trailing arm when the vehicle moves in a reverse direction.

39. The trailing arm suspension according to claim 38 wherein the direction sensor is further adapted to detect a forward operation of the vehicle; and the controller controls the valve to exhaust the pressurized air from the pneumatic lift mechanism during forward operation to lower the trailing arm with respect to the frame.

40. The trailing arm suspension according to claim 34 wherein the spring between the trailing arm and the frame is an air spring; and further comprising an air controller fluidly coupling the reservoir to the air spring for controlling the introduction of pressurized air from the reservoir to the air spring.

41. The trailing arm suspension according to claim 34 wherein the axle comprises an elongated hollow body forming the air reservoir.

42. The trailing arm suspension according to claim 41 wherein the hollow body comprises an elongated plate with a U-shaped cross section defining an open top and open ends, a top plate mounted to the U-shaped plate to cover the open top, and end plates mounted to the U-shaped plate to cover the open ends.

43. The trailing arm suspension according to claim 34 wherein the pneumatic lift mechanism is an inflatable bag.

44. In a trailing arm suspension for supporting a vehicle with a pneumatic system and a vehicle frame on an axle with ground engaging wheels, the trailing arm suspension comprising:
   a pair of trailing arm assemblies adapted to be mounted to the vehicle frame in spaced relationship, each of the trailing arm assemblies comprising:
      a trailing arm having one portion adapted to be pivotally mounted to the vehicle frame for pivotal movement about a pivot axis;
      an air spring mounted to the trailing arm and adapted to be mounted to the vehicle frame for resisting the pivotal movement of the trailing arm about the pivotal axis toward the frame and adapted to be coupled to the pneumatic system to supply pressurized air thereto;
      at least a portion of the axle has a hollow interior forming a pressurized air reservoir and is adapted to be pneumatically connected to the pneumatic system;
      the axle is carried by the trailing arms and connected thereto for movement therewith; and
      the improvement comprises:
         the air reservoir is connected to the air spring for pressurizing the air spring.

45. The trailing arm suspension according to claim 44 and further comprising the pneumatic lift mechanism is also mounted to one of the frame and the axle.

46. The trailing arm suspension according to claim 44 and further comprising a valve between the air reservoir and the pneumatic lift mechanism for controlling the pneumatic pressure to the pneumatic lift mechanism.

47. The trailing arm suspension according to claim 46 and further comprising a direction sensor for detecting a reverse operation of the vehicle the valve opens in response to the detected reverse operation to raise the trailing arm.

48. The trailing arm suspension according to claim 44 and further comprising an air controller fluidly coupling the reservoir to the air spring for controlling the introduction of pressurized air from the reservoir to the air spring.

49. The trailing arm suspension according to claim 44 wherein the axle comprises an elongated hollow body forming the air reservoir.

50. The trailing arm suspension according to claim 49 wherein the hollow body comprises an elongated plate with a U-shaped cross section defining an open top and open ends, a top plate mounted to the U-shaped plate to cover the open top, and end plates mounted to the U-shaped plate to cover the open ends.

51. In an axle for use in a suspension that supports a vehicle with a pneumatic system and a vehicle frame on ground engaging wheels;

the suspension comprising:
   an arm with one portion pivotally mounted to the vehicle frame for pivotal movement about a pivot axis;
   and an air spring operably connecting the arm to the frame for resisting the pivotal movement of the trailing arm about the pivotal axis toward the frame and adapted to be coupled to the pneumatic system to supply pressurized air to the air spring;
   the axle comprising a hollow interior portion forming a pressurized air reservoir that is adapted to be pneumatically connected to the pneumatic system and is adapted to connect to the air spring for pressurizing the air spring.

52. The trailing arm suspension according to claim 51 and further comprising a pneumatic lift mechanism mounted to one of the frame and the axle.

53. The trailing arm suspension according to claim 52 and further comprising a valve between the air reservoir and the pneumatic lift mechanism for controlling the pneumatic pressure to the pneumatic lift mechanism.

54. The trailing arm suspension according to claim 53 and further comprising a direction sensor for detecting a reverse operation of the vehicle the valve opens in response to the detected reverse operation to raise the arm.

55. The trailing arm suspension according to claim 51 and further comprising an air controller fluidly coupling the reservoir to the air spring for controlling the introduction of pressurized air from the reservoir to the air spring.

56. The trailing arm suspension according to claim 51 wherein the axle comprises an elongated hollow body forming the air reservoir.

57. The trailing arm suspension according to claim 56 wherein the hollow body comprises an elongated plate with a U-shaped cross section defining an open top and open ends, a top plate mounted to the U-shaped plate to cover the open top, and end plates mounted to the U-shaped plate to cover the open ends.

\* \* \* \* \*